(12) United States Patent
Soliman

(10) Patent No.: US 8,687,608 B2
(45) Date of Patent: Apr. 1, 2014

(54) METHOD AND APPARATUS FOR SUPPORTING COMMUNICATION IN PICO NETWORKS

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 888 days.

(21) Appl. No.: 11/620,629

(22) Filed: Jan. 5, 2007

(65) Prior Publication Data

US 2008/0165709 A1     Jul. 10, 2008

(51) Int. Cl.
*H04W 4/00* (2009.01)

(52) U.S. Cl.
USPC ........... 370/338; 370/310; 370/328; 370/331; 455/552.1; 455/553.1

(58) Field of Classification Search
USPC .............. 455/41.2, 41.3, 552.1, 553.1, 426.1, 455/550.1, 414.1, 426.2, 436, 437, 438, 455/420, 432.1, 433, 554.1, 554.2, 555; 370/310, 328, 331, 338
See application file for complete search history.

(56) References Cited

U.S. PATENT DOCUMENTS

| | | | |
|---|---|---|---|
| 6,101,176 A * | 8/2000 | Honkasalo et al. | 370/335 |
| 6,611,507 B1 * | 8/2003 | Hottinen et al. | 370/331 |
| 7,260,399 B1 * | 8/2007 | Oh et al. | 455/436 |
| 7,548,758 B2 * | 6/2009 | Periyalwar et al. | 455/517 |
| 2002/0105913 A1 | 8/2002 | Miya | |
| 2003/0169697 A1 * | 9/2003 | Suzuki et al. | 370/310 |
| 2003/0235175 A1 * | 12/2003 | Naghian et al. | 370/338 |
| 2004/0229563 A1 | 11/2004 | Fitton et al. | |
| 2004/0235482 A1 * | 11/2004 | Sylvain | 455/445 |
| 2005/0153736 A1 * | 7/2005 | Ganton | 455/553.1 |
| 2005/0181805 A1 * | 8/2005 | Gallagher | 455/456.1 |

(Continued)

FOREIGN PATENT DOCUMENTS

| | | |
|---|---|---|
| EP | 0865172 A2 | 9/1998 |
| EP | 1686713 | 8/2006 |

(Continued)

OTHER PUBLICATIONS

International Search Report and Written Opinion—PCT/US2007/088968, International Search Authority—European Patent Office—Jun. 30, 2008.

(Continued)

*Primary Examiner* — Meless N Zewdu
*Assistant Examiner* — Michael Nguyen
(74) *Attorney, Agent, or Firm* — Fariba Yadegar-Bandari

(57) ABSTRACT

Techniques for extending coverage of a wireless communication network (e.g., a cellular network) to indoor and other locations are described. A wireless device may communicate with a base station in a wireless network via downlink and uplink frequency channels in a licensed frequency band using frequency division duplexing (FDD). The wireless device may communicate with a piconet base station (PBS) in a pico network (piconet) via the uplink frequency channel using time division duplexing (TDD). The PBS may communicate with the wireless device on the uplink frequency channel and may exchange data with the wireless network via a wireline communication link. The PBS may forward data received from the wireless device to the wireless network and may also forward data received from the wireless network for the wireless device to the wireless device. The PBS may receive paging messages from the wireless network for the wireless device and may forward the paging messages to the wireless device.

22 Claims, 10 Drawing Sheets

(56) References Cited

U.S. PATENT DOCUMENTS

| | | | |
|---|---|---|---|
| 2005/0239451 A1* | 10/2005 | Periyalwar et al. | 455/425 |
| 2007/0054620 A1* | 3/2007 | Zeira et al. | 455/63.1 |
| 2007/0207806 A1* | 9/2007 | Shaheen | 455/436 |
| 2007/0281617 A1* | 12/2007 | Meylan et al. | 455/41.2 |
| 2008/0069028 A1* | 3/2008 | Richardson | 370/328 |

FOREIGN PATENT DOCUMENTS

| | | |
|---|---|---|
| JP | 2001358644 A | 12/2001 |
| JP | 2006524965 A | 11/2006 |
| KR | 20020044892 A | 6/2002 |
| KR | 20050005603 A | 1/2005 |
| RU | 2201034 C2 | 3/2003 |
| WO | WO9914897 A2 | 3/1999 |
| WO | WO9967967 | 12/1999 |
| WO | WO0178431 | 10/2001 |
| WO | WO2004095719 A2 | 11/2004 |

OTHER PUBLICATIONS

Nevdiaev L.M. Telecommunication technology, English Russian glossary under edited by Yu. M. Gornostaev, "Communication and Business", Moscow, 2002, p. 120, p. 482, p. 333.

Taiwan Search Report—TW097100480—TIPO—May 21, 2011.

* cited by examiner

METHOD AND APPARATUS FOR SUPPORTING COMMUNICATION IN PICO NETWORKS

BACKGROUND

I. Field

The present disclosure relates generally to communication, and more specifically to techniques for extending coverage of a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, etc.

In a wireless network, a wireless device (e.g., a cellular phone) may communicate with a base station via the downlink and uplink. The downlink (or forward link) refers to the communication link from the base station to the wireless device, and the uplink (or reverse link) refers to the communication link from the wireless device to the base station. The wireless device may successfully communicate with the base station if the base station can achieve a target received signal quality or better for the wireless device and vice versa. However, the wireless device and/or the base station may not be able to achieve the target received signal quality in certain operating scenarios. For example, the wireless device may be too far from the base station and/or may be indoor within a home or a building. It may be desirable for the wireless device to be able to obtain communication services even in these operating scenarios.

There is therefore a need in the art for techniques to improve coverage of a wireless network.

SUMMARY

Techniques for extending coverage of a wireless communication network (e.g., a cellular network) to indoor and other locations are described herein. In an aspect, a piconet base station (PBS) supports communication for wireless devices (e.g., cellular phones) in a pico network (piconet). The piconet may cover a home, an office, a building, etc. The PBS may allow the wireless devices to obtain communication services such as voice, video, packet data, etc., and/or to receive paging messages from the wireless network.

A wireless device may communicate with a base station in a wireless network using frequency division duplexing (FDD) and may communicate with a PBS in a piconet using time division duplexing (TDD). The wireless device may communicate with the base station via a downlink frequency channel and an uplink frequency channel in a licensed frequency band. The wireless device may communicate with the PBS via the uplink frequency channel. The wireless device may transmit data on the uplink frequency channel to the base station and PBS, receive data on the downlink frequency channel from the base station, and receive data on the uplink frequency channel from the PBS.

The PBS may communicate with me wireless device on the uplink frequency channel using TDD and may also exchange data with the wireless network via a wireline communication link. The PBS may forward data received from the wireless device to the wireless network and may also forward data received from the wireless network for the wireless device to the wireless device. The PBS may assign time slots to the wireless device and may exchange data with the wireless device in the assigned time slots. The PBS may receive paging messages from the wireless network for the wireless device and may forward the paging messages to the wireless device. The PBS may be implemented with an application specific integrated circuit (ASIC) such as a mobile station modem (MSM) commonly used for the wireless device.

Various aspects and features of the disclosure are described in further detail below.

DETAILED DESCRIPTION

The techniques described herein may be used for various wireless communication networks. The terms "network" and "system" are often used interchangeably. For example, the techniques may be used for wireless wide area networks (WWANs) and cellular networks such as CDMA networks, TDMA networks, FDMA networks, OFDMA networks, etc. A CDMA network may implement a radio technology such as Wideband-CDMA (W-CDMA), cdma2000, etc. cdma2000 covers IS-2000, IS-95, and IS-856 standards. A TDMA network may implement a radio technology such as Global System for Mobile Communications (GSM), WiMax, etc. These various radio technologies and standards are known in the art W-CDMA and GSM are described in documents from an organization named "3rd Generation Partnership Project" (3GPP). cdma2000 is described in documents from an organization named "3rd Generation Partnership Project 2" (3GPP2). WiMax is described in IEEE 802.16 documents from an organization named "The Institute of Electrical and Electronics Engineers (IEEE)". 3GPP, 3GPP2 and IEEE 802.16 documents are publicly available. For clarity, the techniques are described below for a 3GPP network.

Figure 1:
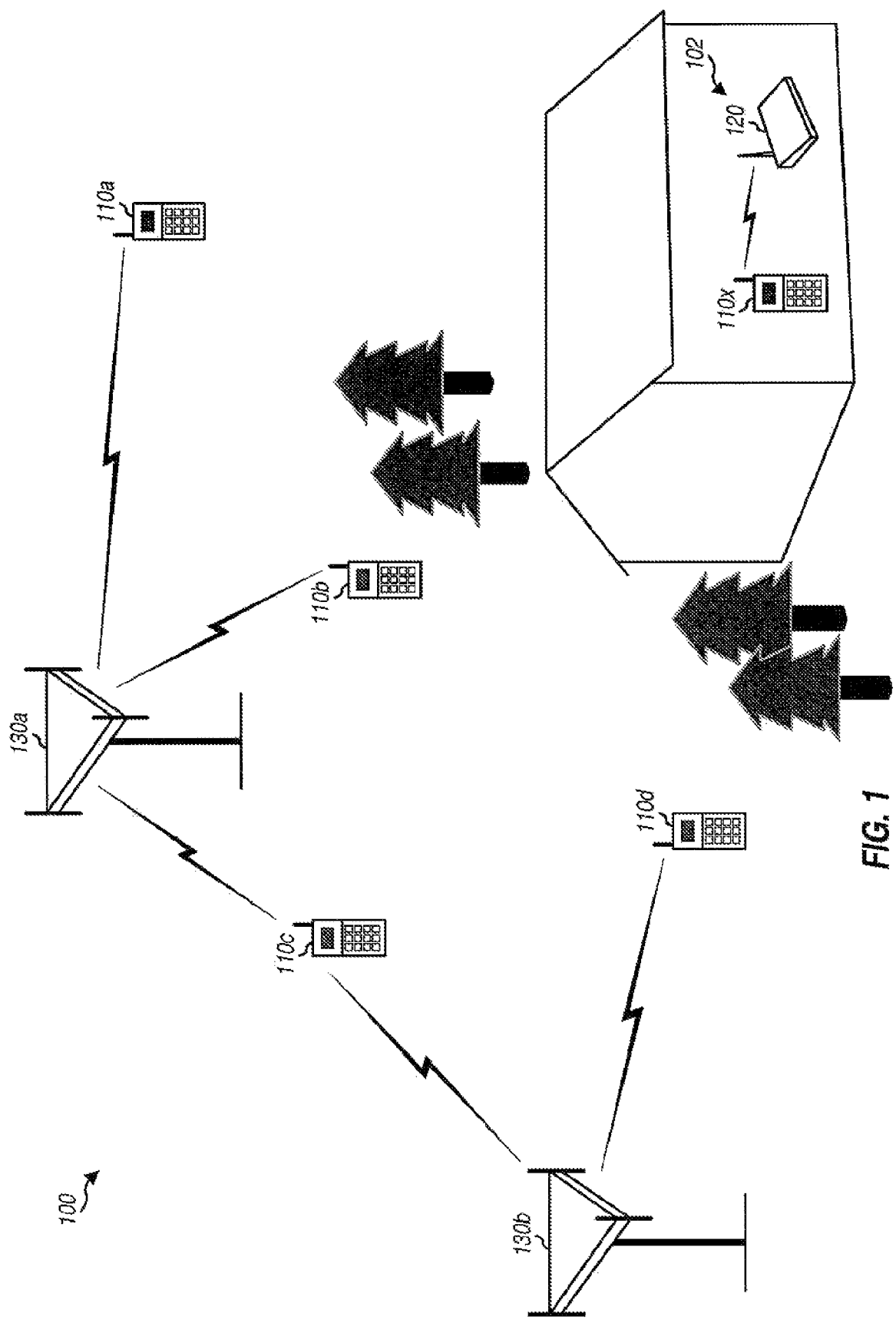
FIG. 1 shows a wireless communication network and a piconet.

FIG. 1 shows a wireless communication network 100 with multiple base stations. For simplicity, only two base stations 130a and 130b are shown in FIG. 1. A base station is generally a fixed station that communicates with the wireless devices and may also be referred to as a Node B, an enhanced Node B (eNode B), an access point (AP), etc. Each base station 130 provides communication coverage for a particular geographic area. The term "cell" can refer to a base station and/or its coverage area depending on the context in which the term is used. To Improve system capacity, a base station coverage area may be partitioned into multiple smaller areas. Each smaller area may be served by a respective base transceiver subsystem (BTS). The term "sector" can refer to a BTS and/or its coverage area depending on the context in which the term is used.

Wireless devices 110 may be dispersed throughout me wireless network. A wireless device may be stationary or mobile and may also be referred to as a user equipment (UE), a mobile station (MS), a mobile equipment (ME), a terminal, an access terminal (AT), a station (STA), etc. A wireless device may be any device capable of radio communication and may be a cellular phone, a personal digital assistant (PDA), a handset, a handheld device, a subscriber unit, a wireless modem, a laptop computer, a personal computer (PC), an ultra mobile PC (UMPC), etc. A wireless device may communicate with zero, one, or multiple base stations on the downlink and/or uplink at any given moment.

Some wireless devices may be in good coverage of base stations 130 while other wireless devices may be in poor coverage. The coverage observed by a given wireless device may be quantified by pilot strength, received signal quality, etc. The observed coverage may be dependent on various factors such as the distance to the base stations, terrain, obstructions, etc. For example, wireless devices 110a through 110d may be in good coverage of base stations 130a and 130b whereas wireless device 110x is located indoor and may receive weak signals for these base stations. It may still be possible for wireless device 110x to communicate with base station 130a or 130b. However, a low data rate may be achieved for wireless device 110x and/or more radio resources may be consumed in order to support communication for wireless device 110x.

In an aspect, a piconet base station (PBS) 120 supports communication for wireless devices (e.g., wireless device 110x) in a pico network (piconet) 102. PBS 120 may effectively extend the coverage of wireless network 100 to an area where coverage from base stations 130 may be poor. PBS 120 may also be referred to as a personal base station, a home base station, a personal access point, etc. Piconet 102 is a small network covering a small or medium size geographic area such as, e.g., a home, an office, a building, a coffee shop, etc. Piconet 102 may also be referred to as a personal network, a local network, etc. PBS 120 may communicate with one or more wireless devices in piconet 102 and may allow these wireless devices to obtain various communication services such as voice, video, packet, data, messaging, paging, etc. via wireless network 100. The communication link from wireless device 110x to PBS 120 is called the uplink, and the communication link from PBS 120 to wireless device 110x is called the downlink.

Figure 2:
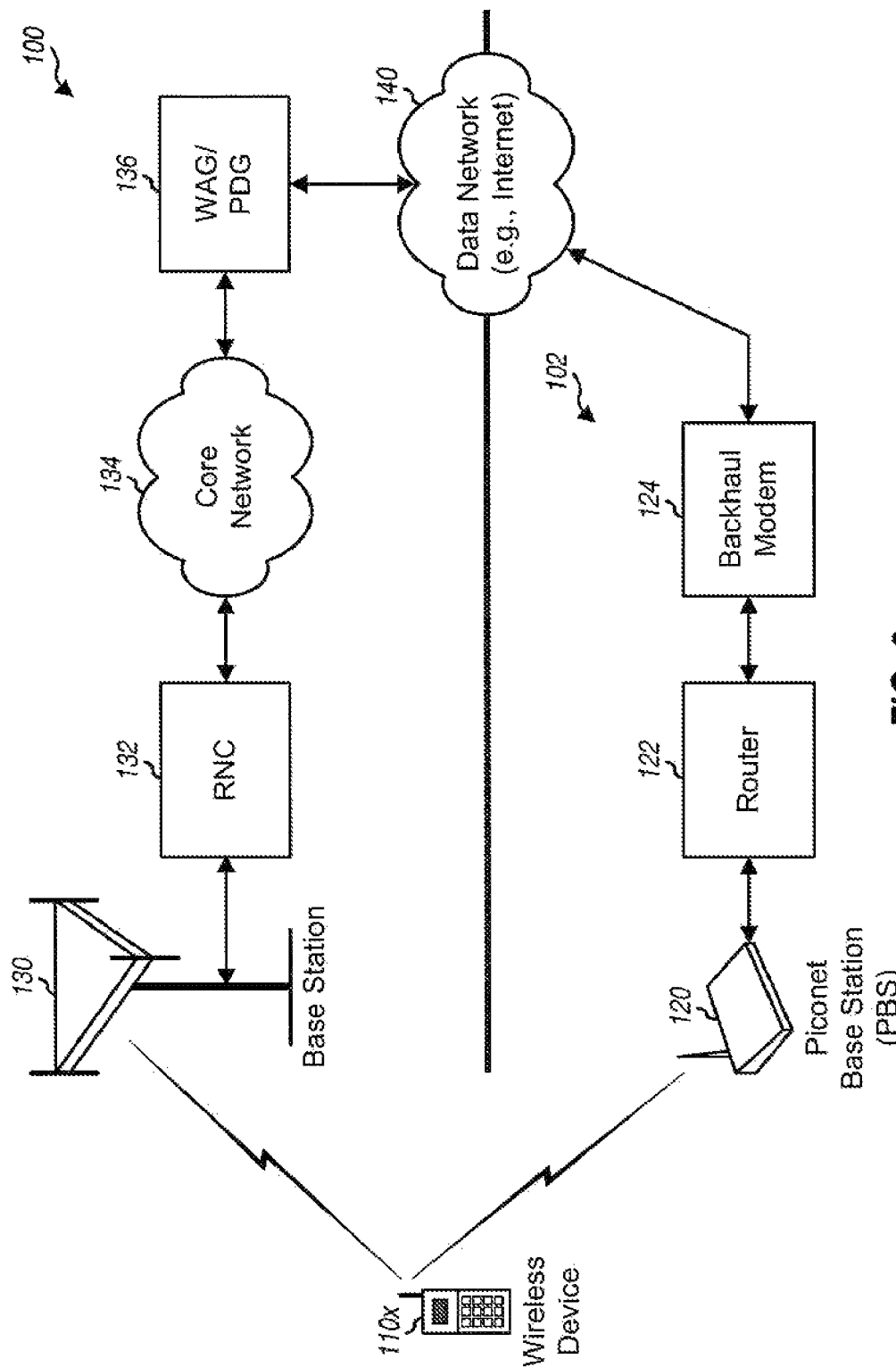
FIG. 2 shows various network entities in the wireless network and piconet.

FIG. 2 shows various network entities in wireless network 100 and piconet 102. In wireless network 100, base stations 130 may couple to a radio network controller (RNC) 132 that may provide coordination and control for these base stations. RNC 132 may also be referred to as a base station controller (BSC), etc. Base station 130 and RNC 132 may be part of a Radio Network Subsystem (RNS). RNC 132 may couple to a core network 134 that may perform various functions and support various services. For example, core network 134 may include network entities that perform data routing, mobility management, etc. A WLAM access gateway (WAG)/packet data gateway (PDG) 136 may couple to core network 134 and support interacting between wireless local area networks (WLANs) and wireless network 100. WAG/PDG 136 may enable stations in Internet Protocol (IP) networks to access functions and services supported by core network 134.

Wireless network 100 may also include other network entities not shown in FIG. 2. Wireless network 100 may implement IP Multimedia Subsystem (IMS), which is a networking architecture that supports mobile and fixed multimedia services such as Voice-over-IP (VoIP), packet data, etc.

In piconet 102, PBS 120 may couple to a router 122 via various interfaces such as Universal Serial Bus (USB), RJ45 or Ethernet, Bluetooth, etc. Router 122 may facilitate exchanges of packet data between PBS 120 and external networks. Router 122 may couple to a backhaul modem 124, which may support communication with a data network 140. Backhaul modem 124 may be a cable modem, a Digital Subscriber Line (DSL) modem, a satellite modem, etc. Data network 140 may be the Internet or some other private and/or public data network.

In another design, PBS 120 includes router 122 and is coupled to backhaul modem 124. In yet another design, PBS 120 includes backhaul modem 124 and communicates with data network 140. In general, PBS 120 may communicate with wireless devices via a wireless communication link and may exchange data with external networks (such as wireless; network 100, the Internet, etc.) via a wireline communication link.

Figure 3:
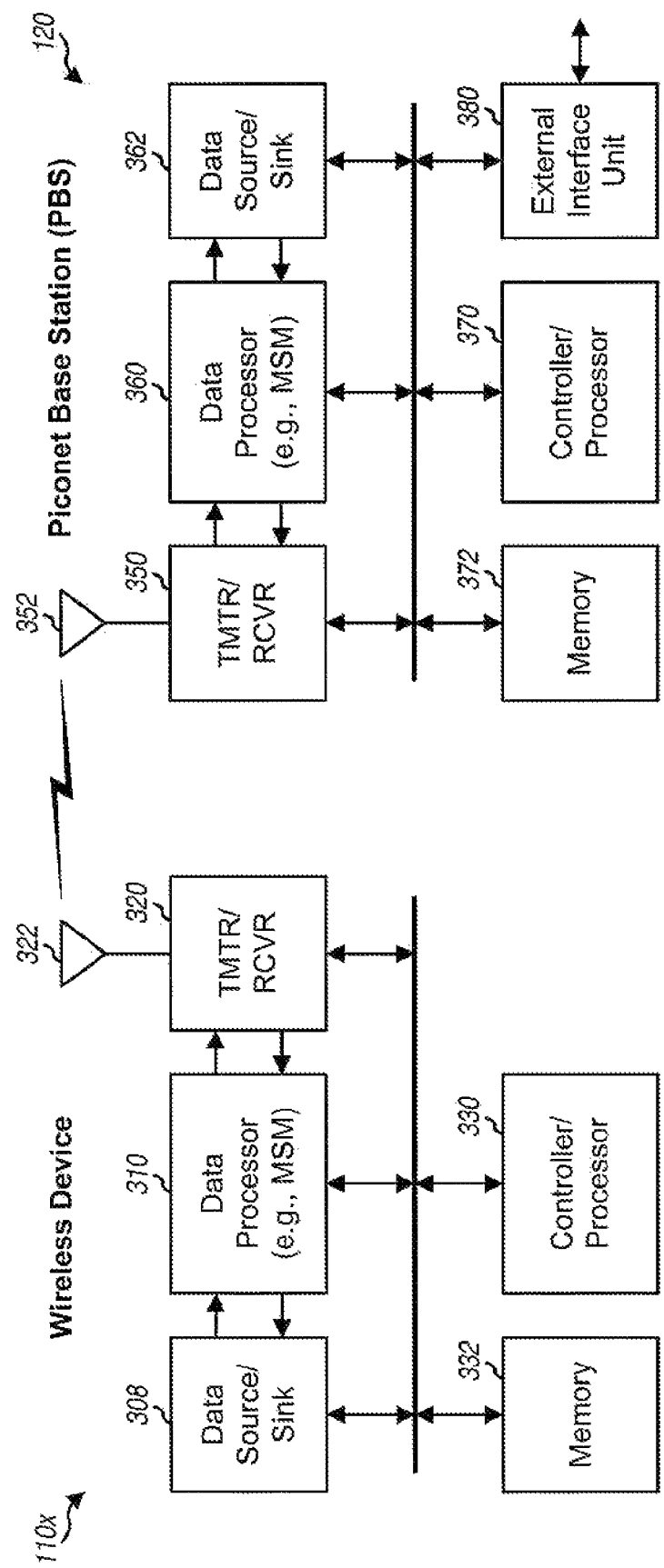
FIG. 3 shows a block diagram of a wireless device and a PBS.

FIG. 3 shows a block diagram of wireless device 110x and PBS 120. At wireless device 110x, a data processor 310 receives traffic data from a data source 308 and processes the traffic data to generate output chips. The processing by data processor 310 is dependent on the radio technology used by wireless network 100 and piconet 102 and may include encoding, interleaving, symbol mapping, spreading, scrambling, etc. A transmitter (TMTR) within a transceiver 320 conditions (e.g., converts to analog, amplifies, filters, and frequency upconverts) the output chips and generates an uplink signal, which is transmitted via an antenna 322.

At PBS 120, an antenna 352 receives the uplink signal from wireless device 110x and provides a received signal to a receiver (RCVR) within a transceiver 350. The receiver conditions (e.g., filters, amplifies, frequency downconverts, and digitizes) the received signal and provides samples. A data processor 360 processes the samples in a manner complementary to the processing by data processor 310 and provides decoded data to a data sink 362. The processing by data processor 360 may include descrambling, despreading, symbol demapping, de-interleaving, decoding, etc.

On the downlink, data processor 360 receives traffic data for wireless device 110x from data source 362 and processes the traffic data to generate output chips. A transmitter within transceiver 350 then conditions the output chips and generates a downlink signal, which is transmitted via antenna 352. At wireless device 110x, the downlink signal is received by antenna 352 and conditioned by a receiver within transceiver 320 to obtain samples. Data processor 310 then processes the samples and provides decoded data to data sink 308. The processing at PBS 120 and wireless device 110x for downlink transmission may be the same as, or different from, the processing for uplink transmission.

Controllers/processors 330 and 370 direct operation of various units at wireless device 110x and PBS 120, respectively. Memories 332 and 372 store data and program codes for wireless device 110x and PBS 120, respectively. An external interface unit 380 supports data exchanges between PBS 120 and an external device (e.g., router 122) and/or an external network (e.g., data network 140).

Data processors 310 and 360 may each be implemented with one or more integrated circuits (ICs), application specific integrated circuits (ASICs), etc. In one design, data processors 310 and 360 are each implemented with a Mobile Station Modem (MSM) ASIC from Qualcomm Incorporated in San Diego, Calif. In general, data processor 360 within PBS 120 may be implemented with the same or similar ASIC used for data processor 310 within wireless device 110x. This may simplify the design of PBS 120 and/or reduce the cost of PBS 120.

Wireless device 110x may have capability to communicate with base stations 130 in wireless network 100 as well as PBS 120. This would allow wireless device 110x to obtain wide area coverage from wireless network 100 as well as good indoor coverage from PBS 120. PBS 120 may have capability to communicate with wireless device 110x via a wireless link and with wireless network 100 via a wireline link. This would allow PBS 120 to provide good indoor coverage for wireless device 110x and achieve high throughput data exchanges with wireless network 100 without utilizing valuable radio resources.

Wireless network 100 may utilize frequency division duplexing (FDD) for communication between the base stations and wireless devices. With FDD, two separate frequency channels are used for tire downlink and uplink. An uplink transmission may occur simultaneously with a downlink transmission on the two frequency channels. The frequency channel used for the downlink is referred to as a downlink channel, and the frequency channel used for the uplink is referred to as an uplink channel.

In an aspect, time division duplexing (TDD) is used for communication between wireless device 110x and PBS 120. With TDD, a single frequency channel is used for both the downlink and uplink. Uplink transmissions may be sent in some time slots and downlink transmissions may be sent in other time slots on the same frequency channel. In one design, the uplink channel is used for TDD communication between wireless device 110x and PBS 120. This design allows wireless device 110x to communicate with PBS 120 while monitoring for signals from base stations in wireless network 100. This design also efficiently reuses existing frequency channels for both wireless network 100 and piconet 102. In another design, a different frequency channel (which is not used for FDD) is used for TDD communication between wireless device 110x and PBS 120. For example, some frequency channels in a licensed frequency band may be reserved for TDD operation. This design avoids interference to the downlink and uplink channels used by wireless network 100. In other designs, FDD may be used for communication between wireless device 110x and PBS 120, e.g., using the same downlink and uplink channels used by wireless network 100 or another pair of frequency channels. In yet another design, wireless network 100 may utilize TDD for communication between the base stations and wireless devices, and TDD may also be used for communication between wireless device 110x and PBS 120. In this case, the same frequency channel may be used for the communication links in both wireless network 100 and piconet 102, or a separate frequency channel may be used for each network. For clarity, much of the following description assumes that wireless device 110x and PBS 120 communicate using TDD on the uplink channel.

The frequency channel used for TDD communication between PBSs and wireless devices and the frequency channels used for FDD communication between base stations and wireless devices may belong in a licensed frequency band. A licensed band is a frequency band in which a license from a regulatory agency (e.g., the Federal Communication Commission (FCC) in the United States) is required for operation in the frequency band. Table 1 lists some licensed bands that are commonly used for 3GPP and 3GPP2 networks.

TABLE 1

| Frequency Band | Frequency Band | Uplink (MHz) | Downlink (MHz) | Common Name |
|---|---|---|---|---|
|  | UMTS Band I | 1920–1980 | 2110–2170 | IMT-2000 |
| GSM 1900 | UMTS Band II | 1850–1910 | 1930–1990 | PCS |
| GSM 1800 | UMTS Band III | 1710–1785 | 1805–1880 | DCS |
|  | UMTS Band IV | 1710–1770 | 2110–2170 |  |
| GSM 850 | UMTS Band V | 824–849 | 869–894 | Cellular |
|  | UMTS Band VI | 830–840 | 875–885 |  |
| GSM 900 |  | 890–915 | 935–960 |  |

The licensed frequency band used for communication between wireless devices, PBSs, and base stations is in contrast to an unlicensed frequency band used in wireless local area networks (WLANs). An unlicensed band is a frequency band in which no license is required for operation. Some examples of unlicensed bands includes the 5 GHz unlicensed national information infrastructure (U-NII) band used in IEEE 802.11b and the 2.4 GHz band used in IEEE 802.11, 802.11b and 802.11g. IEEE 802.11a, b, g are different standards in the IEEE 802.11 family of standards from IEEE for WLANs.

Figure 4:
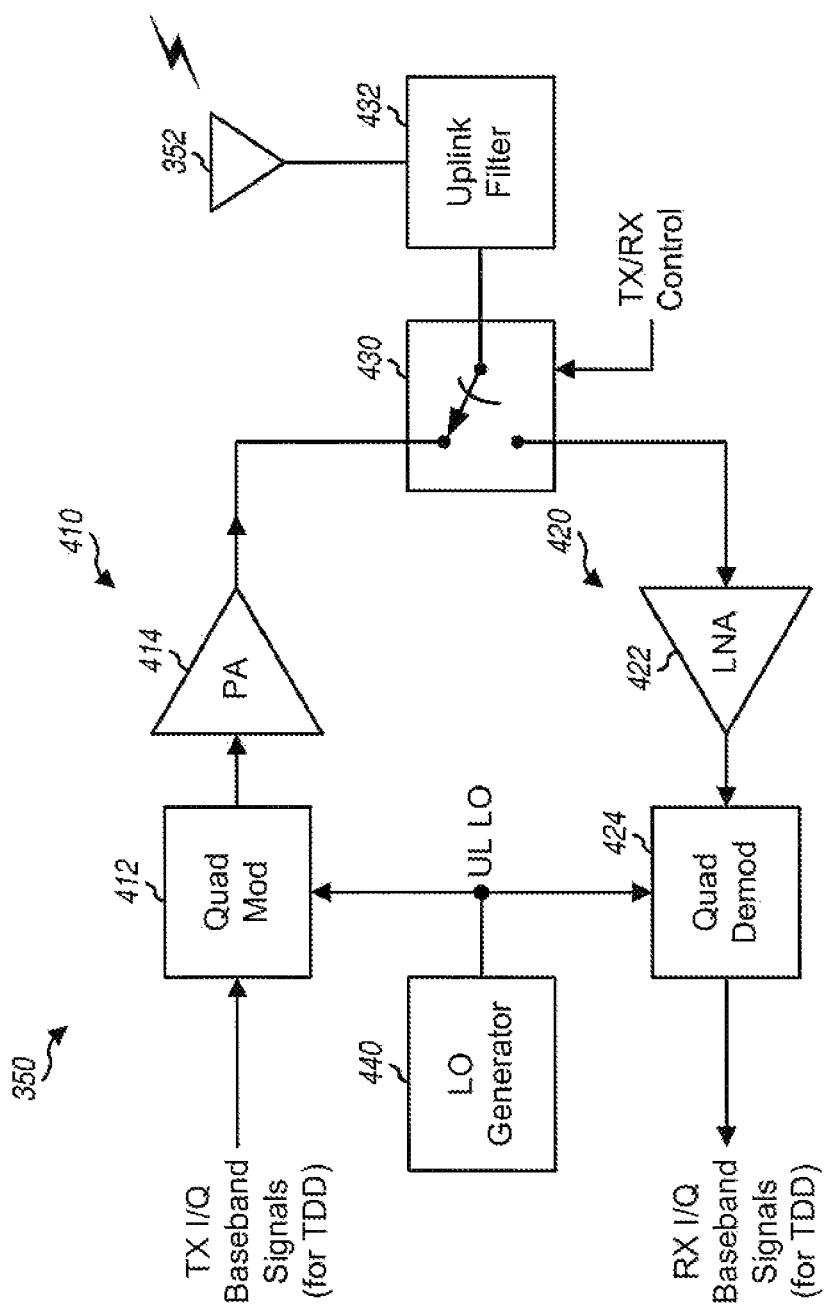
FIG. 4 shows a block diagram of a transceiver supporting TDD.

FIG. 4 shows a block diagram of a design of transceiver 350, which supports TDD operation on the uplink channel. Transceiver 350 includes a transmit path 410 and a receive path 420. In transmit path 410, a quadrature modulator (Quad Mod) 412 receives inphase and quadrature (I/Q) baseband signals from data processor 360, performs quadrature modulation on the I and Q baseband signals with an uplink local oscillator (UL LO) signal from an LO generator 440, and provides a modulated signal. A power amplifier (PA) 414 amplifies the modulated signal to achieve the desired output power level. The amplified signal from power amplifier 414 is routed via a switch 430, filtered by a filter 432, and transmitted via antenna 352. Filter 432 passes signal components in the frequency channel used for transmission (e.g., the uplink channel) and remove images caused by the quadrature modulation process.

In receive path 420, a received signal from antenna 352 is filtered by filter 432, routed via switch 430, and amplified by a low noise amplifier (LNA) 422. Filter 432 passes signal components in the frequency channel of interest (e.g., the uplink channel) and removes signal components at other frequencies. A quadrature demodulator (Quad Demod) 424 performs quadrature demodulation on the amplified signal from LNA 422 with the UL LO signal and provides I and Q baseband signals to data processor 360.

Switch 430 is controlled by a TX/RX control signal, which may be generated by data processor 360 or controller 370. Switch 430 couples power amplifier 414 to filter 432 during time slots used for data transmission and couples filter 432 to LNA 422 during time slots used for data reception.

Figure 5:
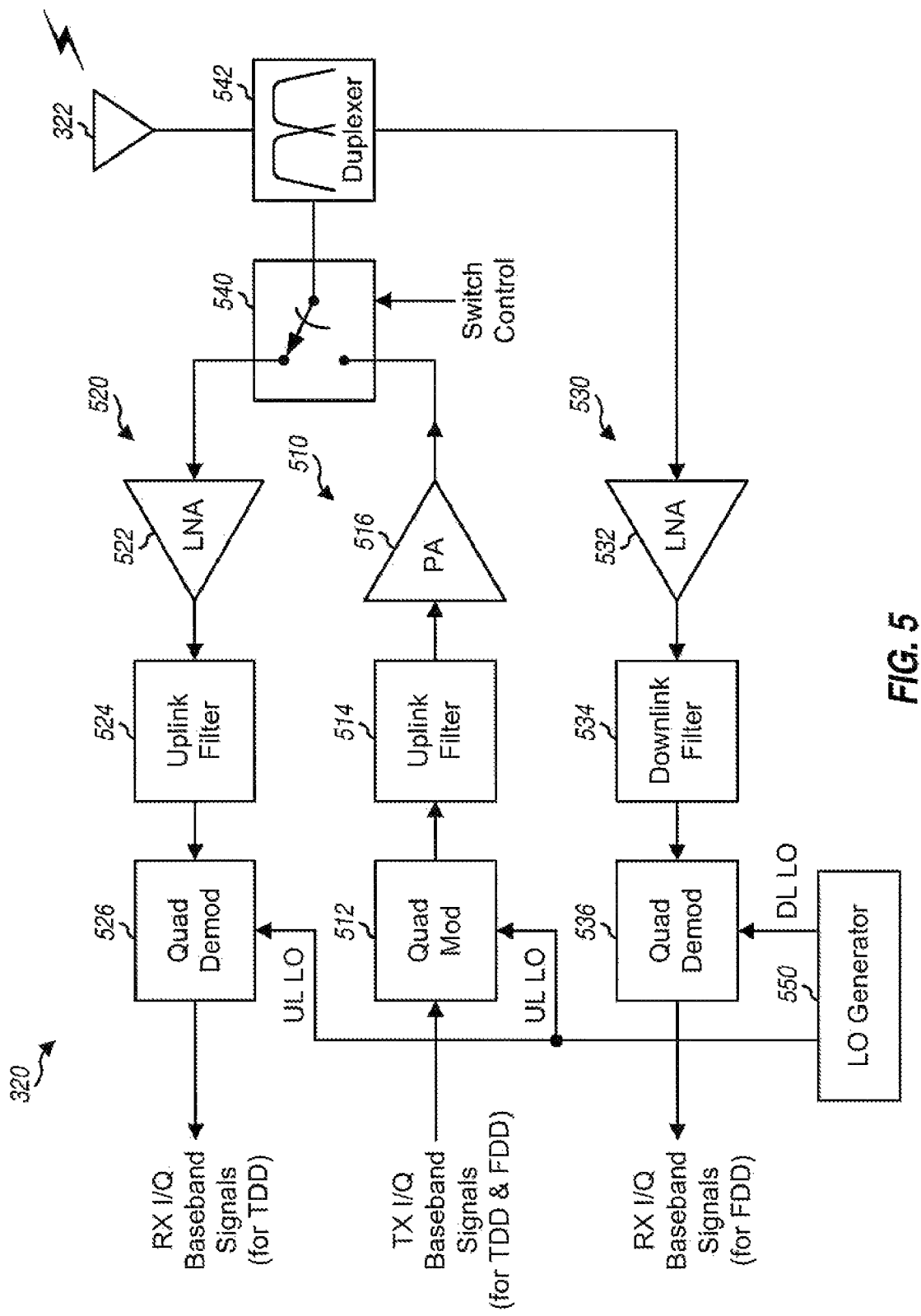
FIG. 5 shows a block diagram of a transceiver supporting FDD and TDD.

FIG. 5 shows a block diagram of a design of transceiver 320, which supports FDD operation on the downlink and uplink channels and TDD operation on the uplink channel. Transceiver 320 includes a transmit path 510 and two receive paths 520 and 530. Transmit path 510 is used for data transmission on the uplink channel for both FDD and TDD operation. Receive path 520 is used for data reception on the uplink channel for TDD operation. Receive path 530 is used for data reception on die downlink for FDD operation.

In transmit path 510, a quadrature modulator 512 receives I and Q baseband signals from data processor 310, performs quadrature modulation on the I and Q baseband signals with an UL LO signal from an LO generator 550, mid provides a modulated signal. A filter 514 filters the modulated signal to pass signal components in the uplink channel and to remove images caused by the quadrature modulation process. A power amplifier 516 amplifies the filtered signal to achieve the desired output power level. The amplified signal from power amplifier 516 is routed via a switch 540, further passed through a duplexer 542, and transmitted via antenna 322.

In receive path 520, a received signal from antenna 322 is routed through duplexer 542 and switch 540, amplified by an LNA 522, and filtered by a filter 524. A quadrature demodulator 526 performs quadrature demodulation on the filtered signal from filter 524 with the UL LO signal and provides I and Q baseband signals to data processor 310. In receive path 530, the received signal from antenna 322 is routed through duplexer 542, amplified by an LNA 532, and filtered by a filter 534. A quadrature demodulator 536 performs quadrature demodulation on the filtered signal from filter 534 with a downlink (DL) LO signal from LO generator 550 and provides I and Q baseband signals to data processor 310.

For TDD operation, transmit path 510 and receive path 520 are active. Switch 540 couples power amplifier 516 to duplexer 542 during time slots used for date transmission and couples LNA 522 to duplexer 542 during time slots used for data reception. Receive path 530 may be powered down during TDD operation to conserve battery power. For FDD operation, transmit path 510 and receive path 530 are active, and receive path 520 may be powered down. Switch 540 couples power amplifier 516 to duplexer 542 during FDD operation.

FIGS. 4 and 5 show two example transceiver designs. In a typical transceiver, the conditioning of the signals in the transmit and receive paths may be performed by one or more stages of amplifier, filter, mixer, etc. These circuit blocks may be arranged differently from the configurations shown in FIGS. 4 and 5. Furthermore, other circuit blocks not shown in FIGS. 4 and 5 may be used to condition the signals in the transmit and receive paths. Transceivers 320 and 350 may each be fabricated on a single radio frequency IC (RFIC) or multiple RFICs.

FIGS. 3 through 5 also show wireless device 110x and PBS 120 equipped with a single antenna. Wireless device 110x and/or PBS 120 may also be equipped with multiple antennas. In general, transceivers 320 and 350 may each include any number of transmit paths and any number of receive paths for each antenna. For example, two antennas may be available, one or two antennas may be used for FDD operation, and one or two antennas may foe used for TDD operation. The second antenna may also be used to achieve high data throughput, to provide receive diversity and/or transmit diversity, etc. Transceivers 320 and 350 may also include transmit and receive paths for Bluetooth and/or other radio technologies.

Figure 6:
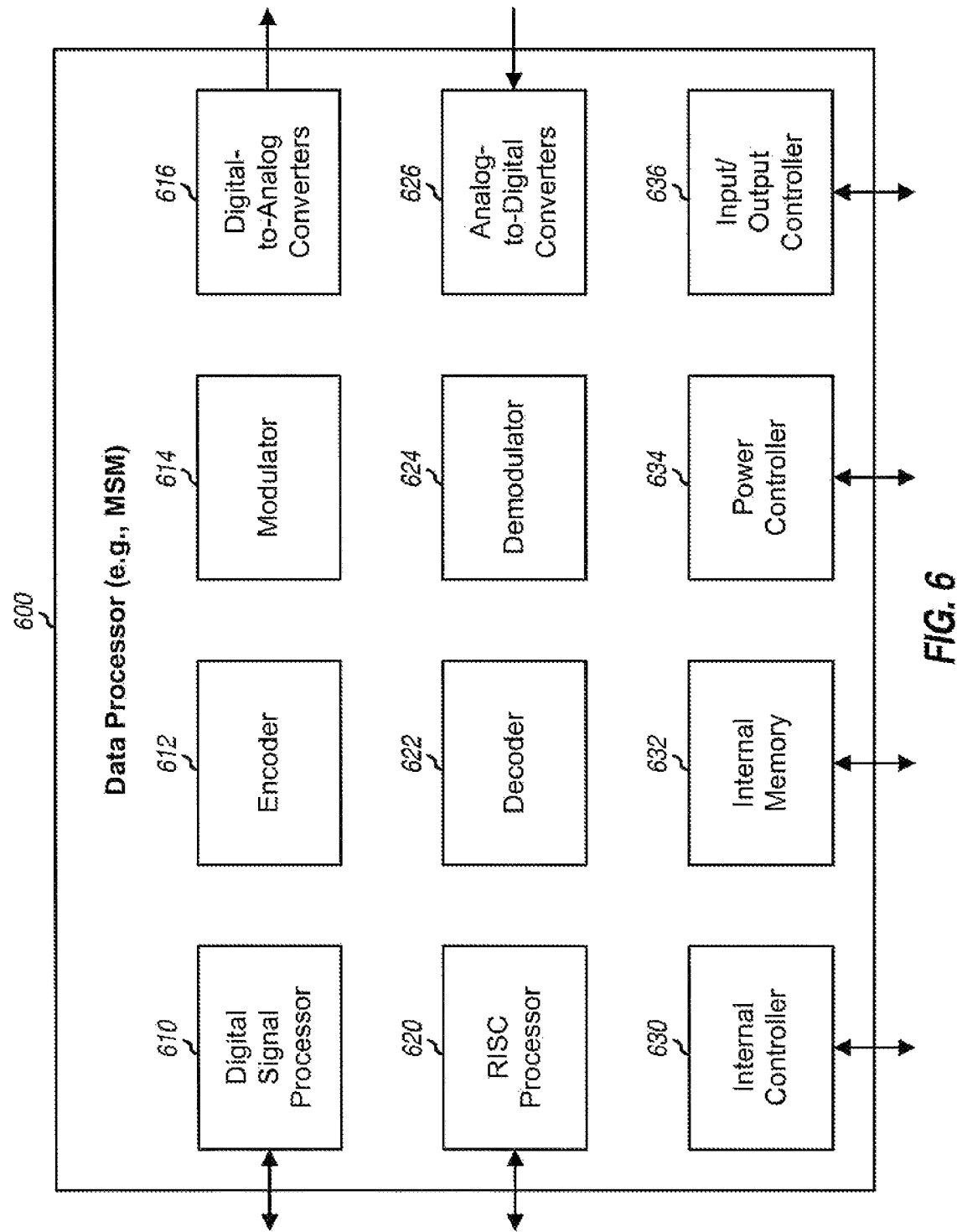
FIG. 6 shows a block diagram of a data processor.

FIG. 6 shows a block diagram of a design of a data processor 600, which may be used for data processor 310 in wireless device 110x and/or data processor 360 in PBS 120 in FIG. 3. Data processor 600 includes various units that perform processing for data transmission and reception and support other functions.

Within data processor 600, a digital signal processor (DSP) 610 may perform various types of processing on data, e.g., encoding and decoding for audio and video, graphics processing, etc. A reduced instruction set computing (RISC) processor 620 may execute software codes for higher layer applications, communication applications (e.g., call processing), etc. For data transmission, an encoder 612 performs encoding of data to be transmitted, a modulator 614 performs processing such as spreading, scrambling, etc., and digital-to-analog converters (DACs) 616 perform conversion of digital data to analog signals. For data reception, analog-to-digital converters (ADCs) 626 perform conversion of analog signals to digital data, a demodulator 624 performs processing such as descrambling, despreading, etc., and a decoder 622 performs decoding of data.

An internal controller 630 controls the operation of various units within data processor 600. An internal memory 632 stores data and program code for data processor 600. A power controller 634 controls power to various units and may power down circuit blocks (e.g., in transceiver 320 or 350) when not heeded in order to conserve battery power. An input/output (I/O) controller 636 may support various interfaces for external devices. For example, I/O controller 636 may support speaker and microphone interfaces for audio, LCD and camera interfaces for video, keypad interface, external memory interface, USB, Ethernet, and/or Bluetooth interfaces, etc.

FIG. 6 shows an example design of data processor 600. In general, a data processor may include any number of blocks and any type of block, which may be different from the blocks shown in FIG. 6.

Figure 7:
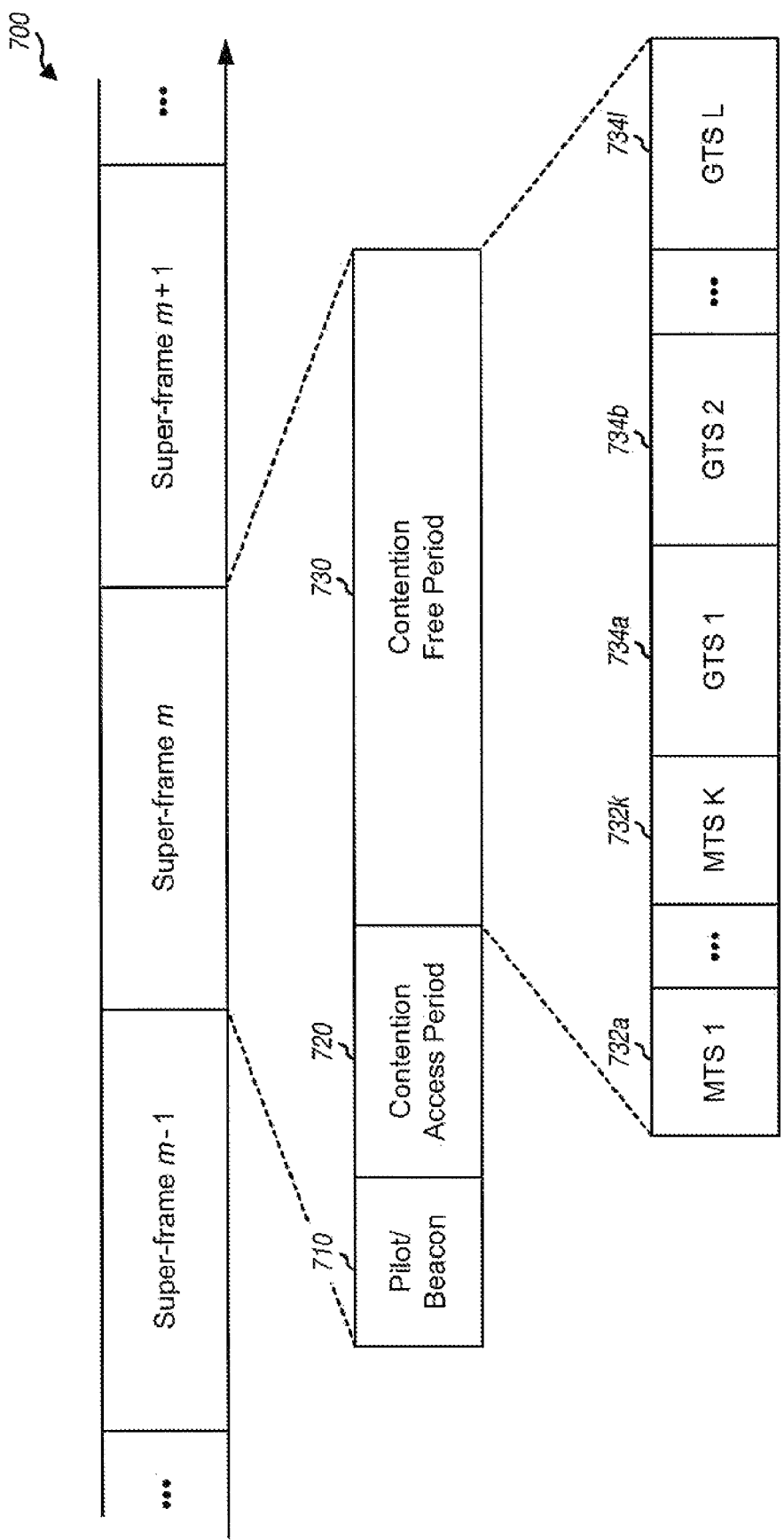
FIG. 7 shows an example super-frame structure.

FIG. 7 shows an example super-frame structure 700 that may be used for TDD communication between PBS 120 and wireless devices, e.g., wireless device 110x. The timeline for transmission may be divided into super-frames. Each super-frame may have a predetermined time duration and may be identified by a superframe number. Each super-frame may be partitioned into a pilot/beacon section 710, a contention access period (CAP) 720, and a contention free period (CFP) 730.

Pilot/beacon section 710 may be used by PBS 120 to broadcast control/system information to wireless devices in the piconet, to allocate resources (e.g., time slots) to wireless devices, to provide time synchronization, etc. Contention access period 720 may be used to support access to the piconet, to send requests and responses for association with PBS 120, to send authentication requests and responses for wireless devices, to exchange parameters for data streams during call setup negotiation, to send command frames, etc. Command frames may be used for communication and negotiation between Medium Access Control (MAC) entities of wireless device 110x and PBS 120. Command frames may communicate information such as association request, association response, disassociation notification, data request, beacon request, etc. Contention free period 730 may include management time slots (MTS) 732 and guaranteed time slots (GTS) 734. Management time slots 732 may be used in lieu of contention access period 720 for command frames. Guaranteed time slots 734 may be assigned to wireless devices for transmission of isochronous and/or asynchronous data streams. An isochronous data stream is a data stream (e.g., a voice stream or a video stream) in which data is delivered with certain time constraints. An asynchronous data stream is a data stream in which data may be broken aid delivered at random times, e.g., for data download.

Management time slots 732 may include (a) open and dedicated time slots used for PBS and wireless device communication, (b) association time slots used for system access, and/or (c) other types of time slots. Each management time slot may have (a) a fixed time duration that may be known a priori by the PBS and wireless devices or (b) a configurable time duration that may be conveyed in the beacon. The number of management time slots in each superframe may be controlled by the PBS, which may act as a piconet controller (PNC), and may be conveyed in the beacon.

Guaranteed time slots 734 may be assigned to wireless devices based on various factors such as the data requirements of the wireless devices, the available time slots, etc. For example, a wireless device may have one or more data streams, and each data stream may be allocated zero, one or multiple guaranteed time slots in a given super-frame. Each guaranteed time slot may be used for uplink transmission from a wireless device to the PBS or for downlink transmission from the PBS to a wireless device. Each guaranteed time slot may have (a) a fixed time duration that may be known a priori by the PBS and wireless devices or (b) a configurable time duration that may be conveyed in the beacon. A guard time may be provided between adjacent guaranteed time slots to avoid collision (e.g., due to clock drift) between transmissions sent in these time slots. The number of guaranteed time slots in each superframe as well as the numbers of guaranteed time slots to use for the downlink and uplink may be controlled by the PBS and conveyed in the beacon.

Guaranteed time slots 734 may include (a) dynamic time slots that may occupy different positions in different super-frames, (b) pseudo-static time slots that may occupy the same position in different super-frames or may vary in position slowly, and (c) other types of time slots. The dynamic and pseudo-static time slots may have different persistence. The dynamic time slots may be identified and/or assigned to wireless devices by a channel time allocation (CTA) information element (IE) sent in the beacon, a time grant command sent on a broadcast channel, etc. The pseudo-static time slots may be assigned to isochronous data streams to allow these streams to meet their time constraints. The PNC may change the positions of the pseudo-static time slots and may communicate and confirm the changes with the wireless devices assigned these time slots.

A super-frame may include one instant of sections 710, 720 and 730, as shown in FIG. 7. A super-frame may also include multiple instants of a given section. Sections 710, 720 and 730 may also be referred to by other names. For example, contention access period 720 may also be referred to as a contention period, a channel access period, etc. Contention free period 730 may also be referred to as a scheduled access period, etc. The time slots may also be referred to by other names. For example, guaranteed time slots 734 may be referred to as transmission opportunities (TXOPs), scheduled time slots, etc.

FIG. 7 shows an example super-frame structure that may be used for TDD communication between a PBS and wireless devices. Other super-frame structures with different sections and/or time slots may also be used for TDD communication.

PBS 120 may transmit a beacon m pilot/beacon section 710 of each super-frame. The beacon provides the "heartbeat" of a piconet, enabling wireless devices to establish and maintain communications in an orderly fashion. The beacon may carry various types of information such as:

An identifier of the PBS (PBS ID),
System/configuration information that may convey the contention access and content free periods and the management and guaranteed time slots in the super-frame, overhead/control channels, etc.,
Assignment information that may convey assignments of guaranteed time slots to wireless devices communicating with PBS 120,
Signaling from PBS 120 such as synchronization, data rate, power saving modes, etc., and
Signaling from wireless network 110 such as paging messages for wireless devices within the coverage of PBS 120.

Wireless devices may detect for beacons from PBSs, e.g., when poor coverage or no coverage is observed for wireless network 100. Wireless devices within the coverage of PBS 120 may receive the beacon sent by the PBS and may recognize the PBS based on the received beacon. These wireless devices may obtain system/configuration information as well as super-frame timing from the received beacon and may attempt to access PBS 120 by sending access probes in contention access period 720 or management time slots 732. PBS 120 may grant access to wireless devices, perform authorization and call setup for these wireless devices, etc. PBS 120 may also inform wireless network 100 of the wireless devices granted access to PBS 120.

PBS 120 may assign guaranteed time slots to active wireless devices operating in a connected mode. An active wireless device and PBS 120 may negotiate for time slots. The active wireless device may request for time slots for downlink and uplink transmissions based on data requirements of the wireless device. PBS 120 may grant time slots to the active wireless device based on the time slots available for assignment, loading at PBS 120, priorities of the wireless devices requesting time slots, etc. The active wireless device may thereafter communicate with PBS 120 via the assigned time slots. The time slot assignment may change during the call. The active wireless device may send a disconnect or termination message at the end of the call to release the assigned time slots.

PBS 120 may forward signaling (e.g., paging messages) from wireless network 100 to idle and active wireless devices. An idle wireless device may be assigned specific super-frames (e.g., every N-th super-frame, where N≥1) in which signaling might be sent to the wireless device. The idle wireless device may (a) wake up periodically and check the beacon in each assigned super-frame for possible signaling for the wireless device and (b) sleep at other time to conserve battery power.

PBS 120 may support various access schemes such as carrier sense multiple access with collision avoidance (CSMA/CA), enhanced distributed channel access (EDCA), slotted Aloha, etc. For CSMA/CA and EDCA, a wireless device listens for a clear wireless channel during time periods designated for system access, e.g., contention access period 720 and/or management time slots 732. If the wireless channel is detected to be clear for a particular contention window, then the wireless device waits a backoff time and transmits if the wireless channel is still clear. CSMA/CA uses a common contention window and randomly selected backoff times for wireless devices whereas EDCA uses different contention windows and backoff times to achieve different probabilities of gaining access to the wireless channel for wireless devices in different priority classes. For slotted Aloha, a wireless device may transmit a frame starting at the beginning of a time slot and may resend the frame if a collision occurs or an acknowledgement is not received for the frame. These various access schemes are known in the art.

CSMA/CA or EDCA may be supported using contention access period 720. Command frames may also be sent in contention access period 720, in which case management time slots 732 may be omitted. Alternatively, slotted Aloha may be supported with management time slots 732, in which ease contention access period 720 may be omitted.

Figure 8:
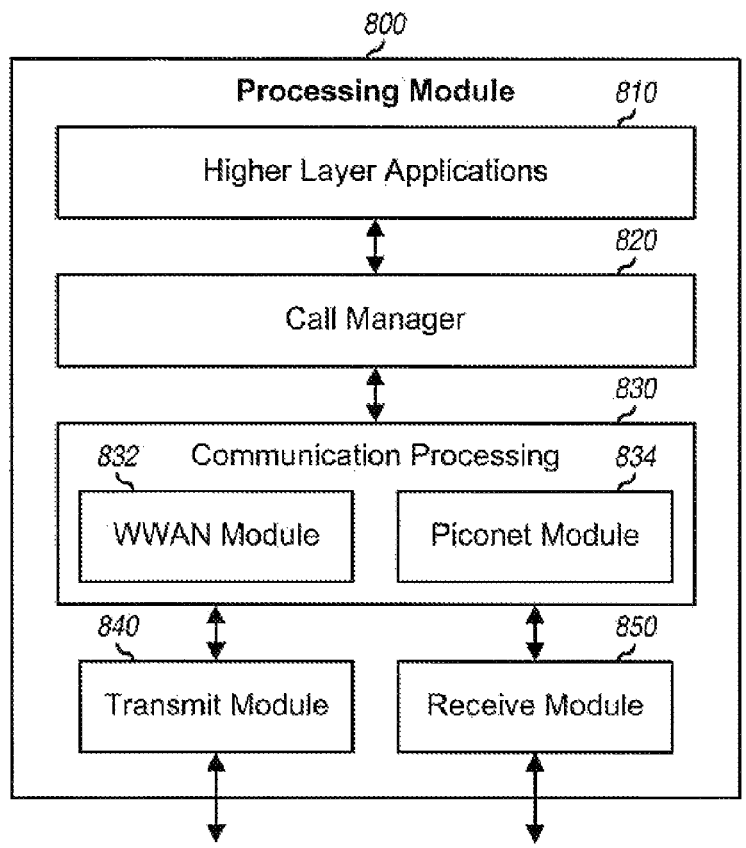
FIG. 8 shows a processing module for the wireless device.

FIG. 8 shows a design of a processing module 800 for wireless device 110x. Processing module 800 may be implemented with software, firmware, hardware, or a combination thereof. Implementation of processing module 800 with software may allow wireless device 110x to support communication with wireless network 100 and piconet 102 with little additional hardware, e.g., using an MSM used for FDD communication with wireless network 100. The software may be executed by data processor 310 or controller/processor 330 in FIG. 3 (e.g., by RISC processor 620 in FIG. 6).

Within processing module 800, higher layer applications 810 may include various end-user applications such as, e.g., user interface (UI) applications, voice applications that provide voice services, data applications that provide data services, a user browser, an email client, etc. The voice and data applications may generate requests to originate voice and data calls, respectively.

A call manager 820 may initiate search for base stations in wireless networks and/or PBSs in piconets and may control access to the wireless networks and piconets. Call manager 820 may also control origination, establishment, and termination of calls to wireless networks and piconets, e.g., as directed by higher layer applications 810. A communication processing module 830 may perform processing for communication with base stations in wireless networks and PBSs in piconets. Module 830 may include (a) a WWAN module 832 that performs processing for signaling exchanged with wireless networks and (b) a piconet module 834 that performs processing for signaling exchanged with PBSs in piconets.

A transmit module 840 controls the operation of the transmitter within transceiver 320 at wireless device 110x. A receive module 850 controls the operation of the receivers within transceiver 320. Call manager 820 may manage time slots assigned to wireless device 110x and may control the operation of modules 840 and 850 based on the assigned time slots so that uplink transmissions are sent and downlink transmissions are received at tire appropriate times.

PBS 120 may perform various functions to manage communication within piconet 102. For example, PBS 120 may control access to piconet 102, receive access requests from wireless devices, and either grant or deny each access request. PBS 120 may allow only a restricted list of wireless devices (e.g., as determined by a piconet operator or a PBS owner) to access the piconet or may allow all wireless devices to access the piconet.

PBS 120 may manage radio resources in various manners. For example, PBS 120 may scan the wireless channel for neighboring PBSs and may report the detected PBSs to a designated entity within wireless network 100, e.g., WAG 136 or some other entity. The designated entity may coordinate channel utilization and assign frequency channels to PBSs such that good performance can be achieved. PBS 120 may request a given wireless device or all wireless devices in piconet 102 to use a particular frequency channel or to switch to another frequency channel, e.g., in order to manage and mitigate interference. PBS 120 may also force an unauthorized wireless device to change frequency channel in order to mitigate interference.

PBS 120 may assign radio/time resources to wireless devices in various manners. PBS 120 may assign pseudo-static time slots to isochronous data streams and dynamic time slots to asynchronous data streams. PBS 120 may also silently grant a previously stored request to download a large amount of data. This request may have been sent previously by a wireless device to the wireless network or piconet but not granted because the wireless network or piconet did not have enough resources.

Figure 9:
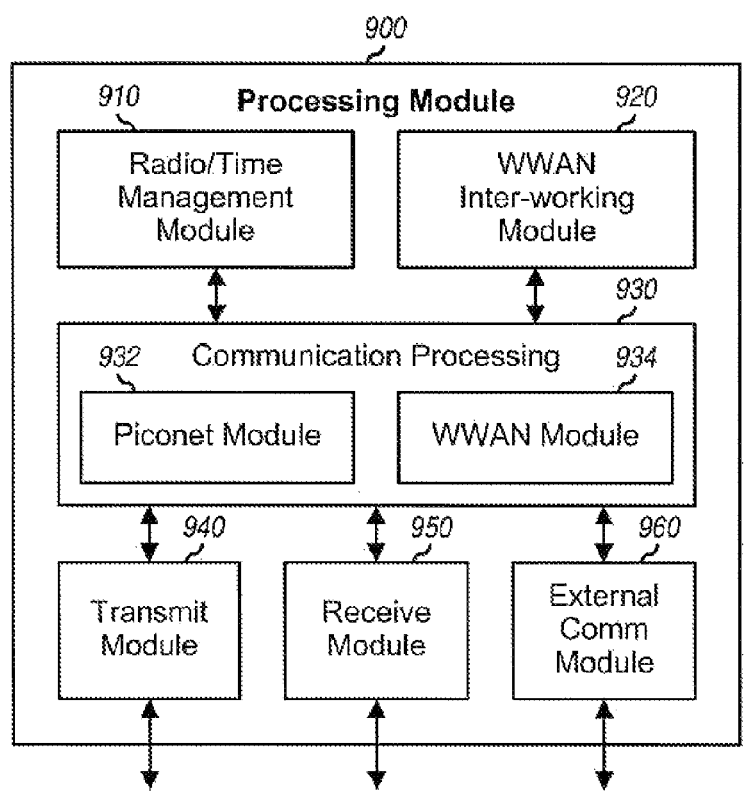
FIG. 9 shows & processing module for the PBS.

FIG. 9 shows a design of a processing module 900 for PBS 120. Processing module 900 may be implemented with software, firmware, hardware, or a combination thereof. Implementation of processing module 900 with software may allow PBS 120 to be designed with the same or similar hardware as wireless device 110x. For example, data processor 360 may be implemented with the same MSM used for data processor 310 in wireless device 110x. The software may be executed by data processor 360 or controller/processor 370 in FIG. 3.

Within processing module 900, a radio/time management module 910 manages radio and time resources for piconet 102. Module 910 may control access to piconet 102, assign time slots to wireless devices, etc. Module 910 may also scan the wireless channel for PBSs in nearby piconets. Module 910 may communicate with WAG 136 (or some other entity) in wireless network 100 and may report the detected PBSs, the loading of PBS 120, etc. WAG 136 may assign a frequency channel to PBS 120 such that balanced load between PBSs and reduced interference may be achieved. In general, the frequency channel used by PBS 120 may be (a) determined/controlled by an entity (e.g., WAG 136) in wireless network 100, (b) unilaterally selected by PBS 120, or (c) fixed at a specific frequency channel. WAG 136 and/or PBS 120 may also set and adjust the transmit power of wireless devices to reduce interference to other wireless devices.

A WWAN inter-working module 920 may support inter-working between wireless network 100 and piconet 102. Module 920 may communicate with WAG 136 (or some other entity) in wireless network 100 for registration and authentication of wireless devices. Module 920 may provide information for wireless devices granted access to piconet 102, receive paging and other messages for wireless devices, and forward the messages to the recipient wireless devices.

A communication processing module 930 may perform processing for communication with wireless devices in piconet 102 and with WAG 136 in wireless network 100. Module 930 may include (a) a piconet module 932 that performs processing for signaling exchanged with wireless devices in piconet 102 and (b) a WWAN module 934 that performs processing for signaling exchanged with wireless network 100.

A transmit module 940 controls the operation of the transmitter within transceiver 350 at PBS 120. A receive module 950 controls the operation of the receiver within transceiver 350. Module 910 may control the operation of modules 940 and 950 based on the time slots assigned to the wireless devices such that downlink transmissions are sent and uplink transmissions are received at the appropriate times. An external communication (Comm) module 960 may communicate with external interface unit 380 as directed by WWAN module 934.

FIGS. 8 and 9 show example processing modules at wireless device 110x and PBS 120, respectively. The operation of wireless device 110x and PBS 120 may also be controlled by other processing modules, which may include different modules than the ones shown in FIGS. 8 and 9.

For communication between PBS 120 and wireless device 110x, data may be partitioned into blocks. At a physical layer (PHY), each block may be processed by a Physical Layer Convergence Protocol (PLCP) as a PLCP protocol data unit (PPDU) and transmitted in one time slot.

Figure 10:
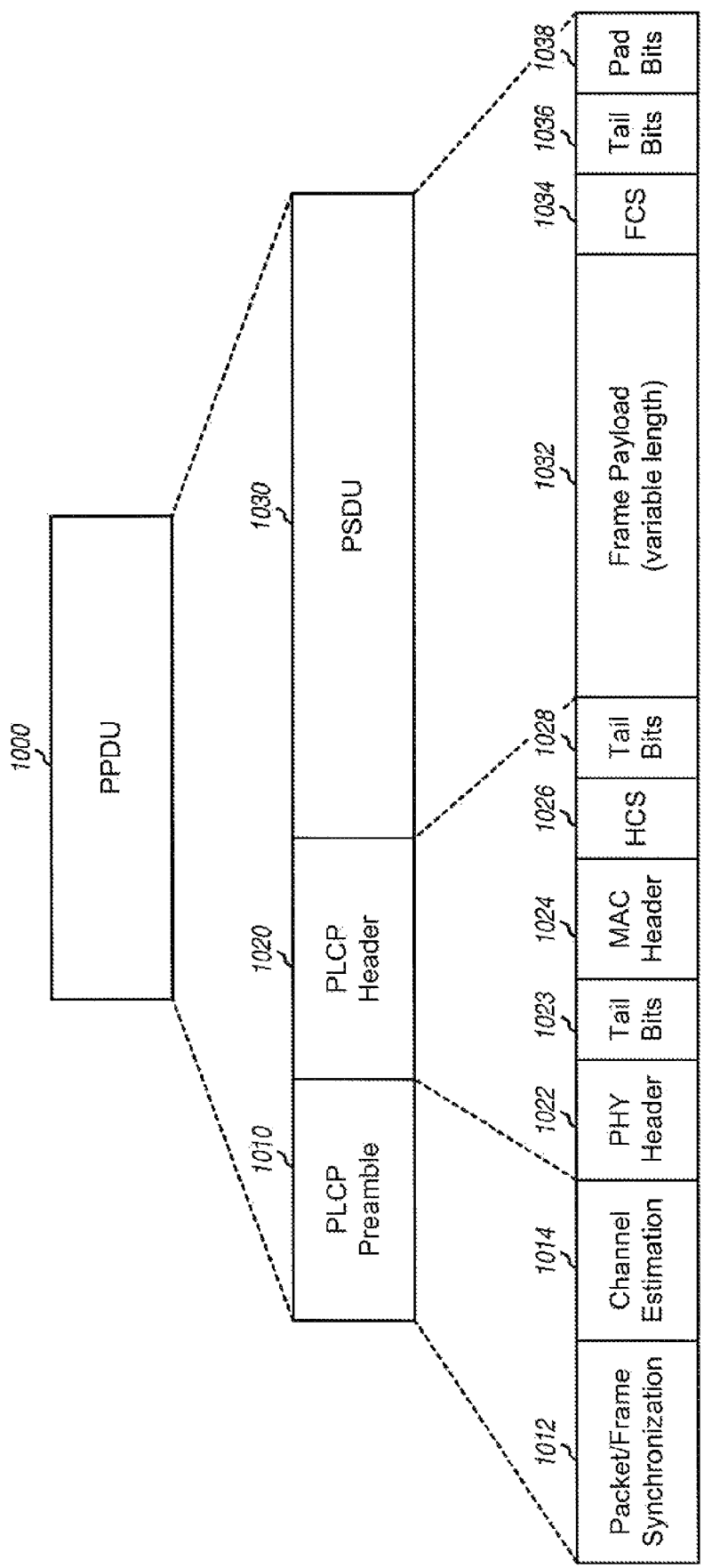
FIG. 10 shows an example frame structure.

FIG. 10 shows an example. PPDU structure that may be used for communication between PBS 120 and wireless device 110x. In this PPDU structure, a PPDU 1000 includes a PLCP preamble 1010, a PLCP header 1020, and a PHY service data unit (PSDU) 1030.

PLCP preamble 1010 includes a packet/frame synchronization field 1012 and a channel estimation field 1014. Synchronization field 1012 may carry a first bit sequence that may be used by a receiving station for signal detection and synchronization. Channel estimation field 1014 may carry a second bit sequence that may be used for channel estimation by the receiving station. The bit sequences for fields 1012 and 1014 may be pseudo-random number (PN) sequences or some other sequences with good signal properties. Channel estimation field 1014 may have (a) a fixed length that may be known a priori or (b) a configurable length that may be selected during call setup and/or at other times. The length of channel estimation field 1014 may be selected to provide the receiving station with sufficient time to perform frequency acquisition and channel estimation prior to receiving PSDU 1030.

PLCP header 1020 includes a PHY header field 1022, a tail bit field 1023, a MAC header field 1024, a header check sequence (HCS) field 1026, and a tail bit field 1028. Field 1022 carries a PHY header, which may convey information such as data rate, length of the frame payload in the PSDU, information for the data scrambler, etc. Field 1023 carries tail bits used to reset an encoder at a transmitting station and a decoder at the receiving station to known states after the PHY header. Field 1024 carries a MAC header, which may convey information such as a piconet ID, a source address, a destination address, a protocol version, acknowledgement (ACK) policy, etc. Field 1026 carries a header check sequence, which may be generated based on fields 1022 and 1024 and used by the receiving station to determine whether the PLCP header is decoded correctly or in error. Field 1028 carries tail bits used to reset the encoder and decoder to known states after the MAC header.

PSDU 1030 includes a frame payload field 1032, a frame check sequence (FCS) field 1034, a tail bit field 1036, and a pad bit field 1038. Field 1032 carries data for PPDU 1000 and may be variable in length. Field 1034 carries a frame check sequence, which may be generated based on field 1032 and used by the receiving station to determine whether the data is decoded correctly or in error. Field 1036 carries tail bits used to reset the encoder and decoder to known states. Field 1038 carries padding bits used to obtain an integer number of octets for PPDU 1000.

FIG. 10 shows an example PPDU structure that may be used for TDD communication between a PBS and wireless devices. Other PPDU structures with different sections and/or fields may also be used for TDD communication.

Figures 11, 12:
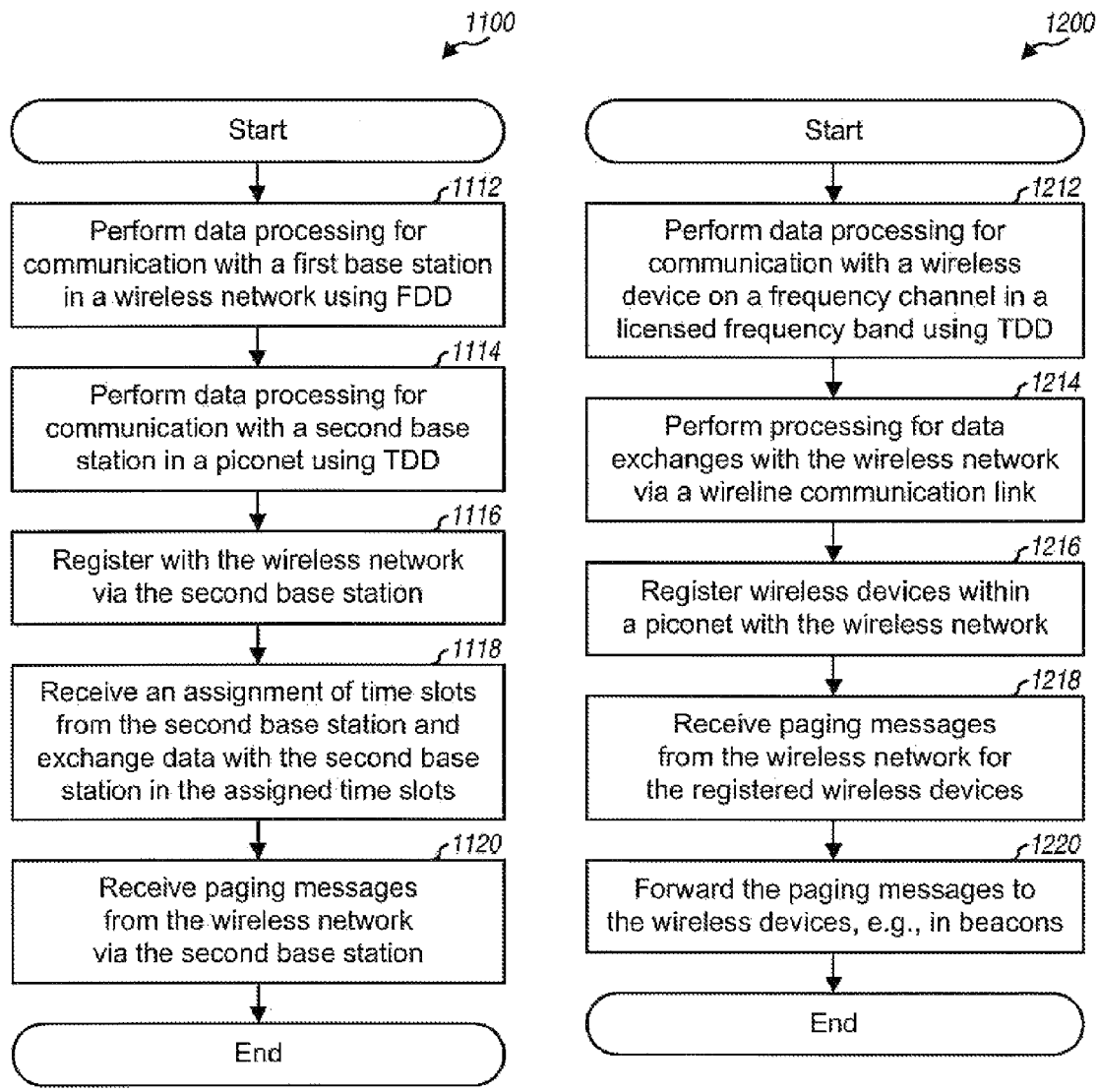
FIG. 11 shows a process performed by the wireless device for communication.
FIG. 12 shows a process performed by the PBS to support communication for wireless devices.

FIG. 11 shows a process 1100 performed by a wireless device for communication with a wireless communication network and a piconet. The wireless device performs data processing for communication with a first base station in the wireless network using FDD (block 1112). The wireless device also performs data processing for communication with a second base station in the piconet using TDD (block 1114). For blocks 1112 and 1114, the wireless device may perform processing for (a) data transmission on an uplink frequency channel to the first and second base stations, (b) data reception on a downlink frequency channel for the first base station, and (c) data reception on the uplink frequency channel for the second base station. The downlink and uplink frequency channels may be in a licensed frequency band. The wireless device may perform data processing in accordance with W-CDMA, cdma2000, or some other radio technology for communication with the first base station. The wireless device may perform data processing in accordance with same radio technology used by the wireless network or a different radio technology for communication with the second base station. The data processing for each base station is dependent on the radio technology and may include, e.g., encoding, decoding, modulation, demodulation, scrambling, descrambling, etc.

The wireless device may detect for base stations in the wireless network, e.g., based on pilots transmitted by these base stations on the downlink frequency channel. The wireless device may detect for base stations in piconets, e.g., based on beacons transmitted by these base stations on the uplink frequency channel. The wireless device may first detect for base stations in the wireless network and, if no such base stations are detected, then detect for base stations in piconets. The wireless device may also detect for base stations in wireless network and piconets in other orders. The wireless device may send information on the detected base stations in the wireless network and/or the detected base stations in nearby piconets to the first base station in the wireless network and/or the second base station in the piconet, e.g., depending on which base station is in communication with the wireless device.

The wireless device may register with the wireless network via the second base station (block 1116). The wireless device may receive an assignment of time slots from the second base station if the wireless device is active and may thereafter exchange data with the second base station hi the assigned time slots (block 1118). The wireless device may exchange data in protocol data units (PDUs), where each PDU may be sent in one assigned time slot, or multiple PDUs may be sent back to back in one time slot with MIFS (Minimum Inter Frame Spacing) between PDUs. A PDU may be part of a packet, a frame, etc. Alternatively or additionally, the wireless device may receive paging messages from the wireless network via the second base station (block 1120).

FIG. 12 shows a process 1200 performed by a PBS to support communication for a piconet. The PBS performs data processing for communication with a wireless device on a frequency channel in a licensed frequency band using TDD (block 1212). The frequency channel may be an uplink frequency channel in a wireless network and may be assigned to the PBS by the wireless network. The PBS performs processing for data exchanges with the wireless network via a wireline communication link (block 1214). The PBS may forward data received from the wireless device to the wireless network and may forward data received from the wireless network for the wireless device to the wireless device. The PBS may assign time slots to the wireless device and may exchange data with the wireless device in the assigned time slots. The data processing at the PBS may be performed with one or more processors, which may be implemented in an ASIC, e.g., an MSM commonly used in a wireless device.

The PBS may send a beacon in each super-frame of a predetermined time duration. The beacon may be used by wireless devices to detect the PBS. The PBS may register wireless devices within its coverage with the wireless network (block 1216). The PBS may receive paging messages from the wireless network for the registered wireless devices (block 1218) and may forward the paging messages to these wireless devices, e.g., in beacons sent in super-frames (block 1220).

The PBS may detect for PBSs in nearby piconets and may send information on the detected PBSs to the wireless network. The PBS may also send load and/or other information on its piconet to the wireless network. The wireless network may control operation of the PBS based on the reported information. For example, the wireless network may assign the frequency channel to the PBS and/or adjust transmit power level of wireless devices in the piconet to achieve good performance for all piconets.

The communication techniques described herein may be implemented by various means. For example, these techniques may be implemented in hardware, firmware, software, or a combination thereof. For a hardware implementation, the processing units at an entity (e.g., a wireless device or a PBS) used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 332 of 372 in FIG. 3) and executed by a processor (e.g., processor 330 or 370). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
at least one processor configured to perform data processing for communication with a wireless communication network via a first base station in the wireless communication network using frequency division duplexing (FDD) over respective uplink and downlink frequency channels, to perform operations for associating with a second base station in a pico network (piconet), to perform, after completing the association, data processing for communication with the wireless communication network via the second base station using time division duplexing (TDD), wherein TDD communications comprise uplink and downlink communications that both share the same frequency channel as the FDD uplink frequency channel for the first base station, and to monitor for signals from the first base station on the FDD downlink frequency while communicating via the second base station on the FDD uplink frequency using TDD; and
a memory coupled to the at least one processor.

2. The apparatus of claim 1, wherein the downlink and uplink frequency channels are in a licensed frequency band.

3. The apparatus of claim 1, wherein the at least one processor is configured to register with the wireless communication network and to receive paging messages from the wireless communication network via the second base station.

4. The apparatus of claim 1, wherein the at least one processor is configured to perform data processing in accordance with a single radio technology for communication with the first and second base stations.

5. The apparatus of claim 1, wherein the at least one processor is configured to perform data processing in accordance with Wideband Code Division Multiple Access (W-CDMA) or cdma2000 for communication with the first base station.

6. The apparatus of claim 1, wherein the at least one processor is configured to receive an assignment of time slots from the second base station and to exchange data with the second base station in the assigned time slots.

7. The apparatus of claim 6, wherein the at least one processor is configured to exchange data in protocol data units (PDUs) sent in the assigned time slots.

8. The apparatus of claim 1, wherein the at least one processor is configured to detect one or more first base stations in the wireless communication network based on one or more pilots transmitted by the one or more first base stations on a downlink frequency channel, and to detect one or more second base stations in piconets based on one or more beacons transmitted by the one or more second base stations on an uplink frequency channel.

9. The apparatus of claim 1, wherein the at least one processor is configured to detect one or more first base stations in the wireless communication network and, if no first base stations are detected, to detect one or more second base stations in piconets.

10. The apparatus of claim 1, wherein the at least one processor is configured to detect other first base stations in the wireless communication network, to detect other second base stations in nearby piconets, and to send information on detected first and second base stations to the first base station in the wireless communication network.

11. The apparatus of claim 1, wherein the at least one processor is configured to detect other first base stations in the wireless communication network, to detect other second base stations in nearby piconets, and to send information on detected first and second base stations to the second base station in the piconet.

12. The apparatus of claim 1, further comprising:
a transceiver comprising a transmit path for sending data to the first and second base stations, a first receive path for receiving data from the first base station, and a second receive-path for receiving data from the second base station.

13. The apparatus of claim 1, wherein the communication with the wireless communication network via the first base station and the communication with the wireless communication network via the second base station comprise communication with a common network entity in the wireless communication network.

14. The apparatus of claim 13, wherein the common network entity is part of a core network subsystem of the wireless communication network.

15. The apparatus of claim 13, wherein the common network entity is part of a wireless access gateway (WAG) / packet data gateway (PDG) of the wireless communication network.

16. The apparatus of claim 15, further comprising:
means for registering with the wireless communication network; and
means for receiving paging messages from the wireless communication network via the second base station.

17. The apparatus of claim 1, wherein the monitoring for signals from the first base station on the FDD downlink frequency is performed in at least one time slot assigned to the apparatus for communicating via the second base station on the FDD uplink frequency.

18. A method comprising:
performing data processing for communication with a wireless communication network via a first base station in the wireless communication network using frequency division duplexing (FDD) over respective uplink and downlink frequency channels;
performing operations for associating with a second base station in a pico network (piconet);
performing, after completing the association, data processing for communication with the wireless communication network via the second base station using time division duplexing (TDD), wherein TDD communications comprise uplink and downlink communications that both share the same frequency channel as the FDD uplink frequency channel for the first base station; and monitoring for signals from the first base station on the FDD downlink frequency while communicating via the second base station on the FDD uplink frequency using TDD.

19. The method of claim 18, further comprising:
registering with the wireless communication network; and
receiving paging messages from the wireless communication network via the second base station.

20. An apparatus comprising:
means for performing data processing for communication with a wireless communication network via a first base station in the wireless communication network using frequency division duplexing (FDD) over respective uplink and downlink frequency channels;
means for performing operations for associating with a second base station in a pico network (piconet);
means for performing data processing for communication with the wireless communication network via the second base station using time division duplexing (TDD), wherein TDD communications comprise uplink and downlink communications that both share the same frequency channel as the FDD uplink frequency channel for the first base station; and
means for monitoring for signals from the first base station on the FDD downlink frequency while communicating via the second base station on the FDD uplink frequency using TDD.

21. The apparatus of claim 1, wherein communication with the wireless communication network via the second base station occurs outside of a handover procedure.

22. A non-transitory computer-readable medium including instructions stored thereon, comprising:
a first instruction set for controlling communication with a wireless communication network via a first base station in the wireless communication network using frequency division duplexing (FDD) over respective uplink and downlink frequency channels;
a second instruction set for controlling operations for associating with a second base station in a pico network (piconet);
a third instruction set for controlling communication with the wireless communication network via the second base station using time division duplexing (TDD), wherein TDD communications comprise uplink and downlink communications that both share the same frequency channel as the FDD uplink frequency channel for the first base station; and
a fourth instruction set for monitoring for signals from the first base station on the FDD downlink frequency while communicating via the second base station on the FDD uplink frequency using TDD.

* * * * *